United States Patent [19]
Deffenbaugh

[11] 3,748,430
[45] July 24, 1973

[54] FLASH WELDING
[75] Inventor: James F. Deffenbaugh, Warren, Ohio
[73] Assignee: Wean Industries, Inc., Youngstown, Ohio
[22] Filed: Aug. 16, 1971
[21] Appl. No.: 172,161

[52] U.S. Cl. ................................................. 219/97
[51] Int. Cl. ............................................ B23k 11/04
[58] Field of Search ................................ 219/97, 98

[56] References Cited
UNITED STATES PATENTS
3,015,021   12/1961   Wangsjo .............................. 219/97

Primary Examiner—R. F. Staubly
Attorney—Michael Williams

[57] ABSTRACT

The invention relates to means for modifying the control of a flash welder in order to provide an automatic pre-heat cycle prior to flash welding. The means may be selectively used at times when preheating of the workpieces is desirable or necessary. When used, it is automatically combined with the weld control at the initiation of the welder and is automatically removed from the combination at the end of a selectable preheat period.

5 Claims, 5 Drawing Figures

INVENTOR.
JAMES F. DEFFENBAUGH
BY
Michael Williams
ATTORNEY

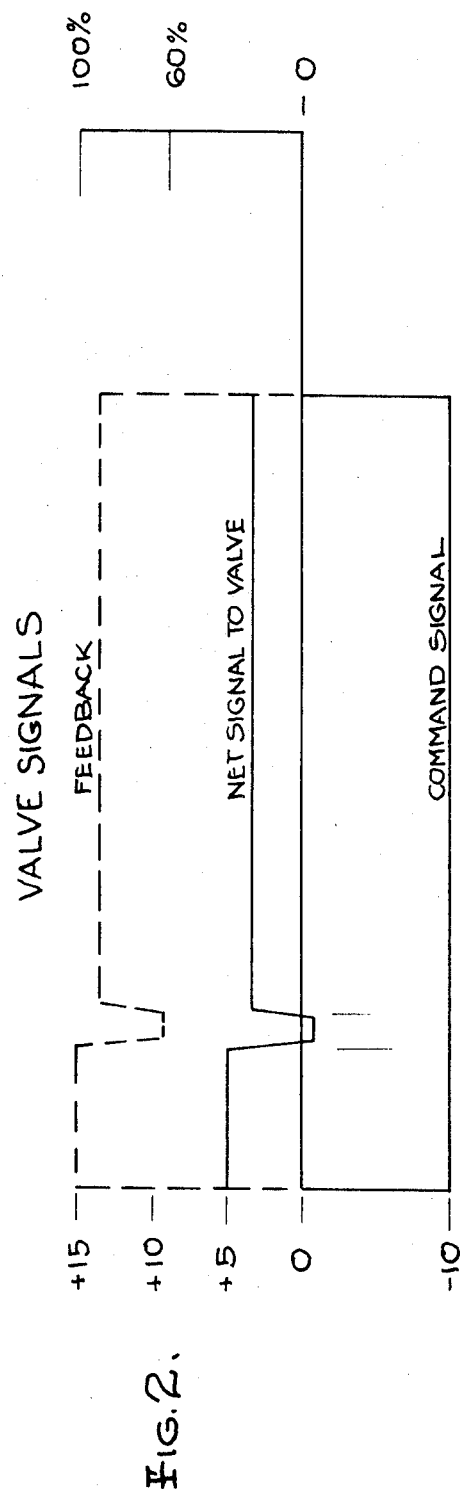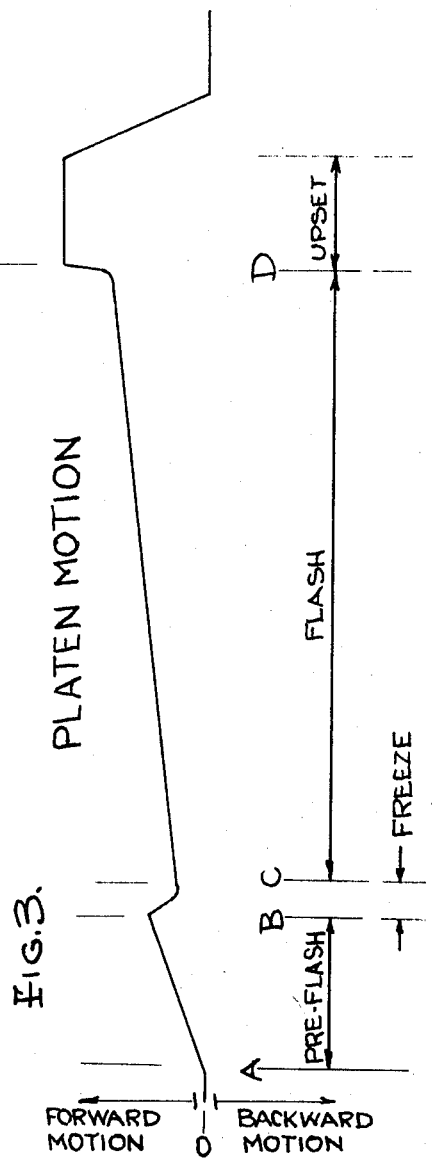

INVENTOR.
JAMES F. DEFFENBAUGH
BY
Michael Williams
ATTORNEY

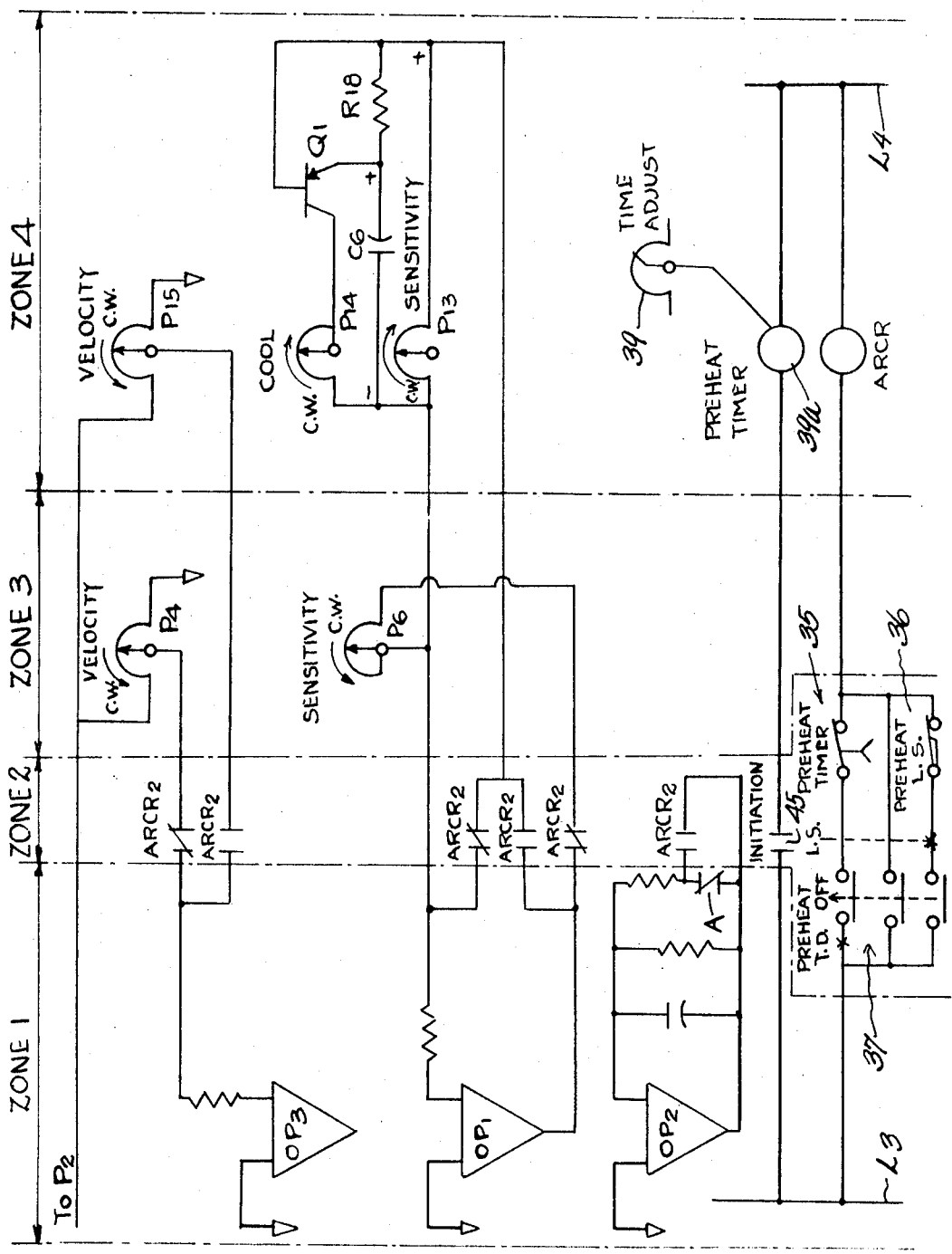

FLASH WELDING

BACKGROUND AND SUMMARY

Known in the prior art are arc-gap-dimension control apparatus for flash welding in which servomechanism is controlled by a reference-voltage signal derived from the input line voltage and an opposing voltage-signal derived from the arc gap. Such control apparatus is disclosed in U.S. Pat. Nos. 3,479,480 and 3,542,994.

However, such control apparatus is effective during the flash welding operation and, insofar as I am aware, does not make provision for a preheating of the ends of the workpieces prior to welding.

It is well known that preheating of the ends of the workpieces is desirable so that the subsequent welding operation is more easily accomplished and better weld results are obtained. This is in large part true because the ends of the workpieces are not usually especially prepared for welding and only a small portion of the contact surfaces come together during the first contact therebetween. Preheating softens the contact surfaces and causes an increase in the actual contact surface, due to the pressure exerted to press the contact surfaces together, and thus produces better current condition during the actual welding operation.

Insofar as I am aware, preheating is normally accomplished by manual control of the platen motion since it has heretofore been difficult to program automatic motion that results in the optimum heating effect of the workpieces. At the start of the preheating cycle the thermal conditions of the workpieces are different than at the end and the time that the workpieces are in contact must be modified for the best results. The use of the feedback signal, as I propose, correctly modifies the platen motion during the preheat cycle since the arc gap voltage changes with the thermal condition of the workpiece interfaces. As the cycle continues, the interface temperature increases, and thus modifies the feedback voltage to in turn proportionately vary the control of the servomechanism.

My invention provides a preheat control which may be selectively used, depending upon whether preheat is necessary or desirable. The preheat control may be set for automatic combination with known arc-gap-dimension control apparatus at the time the start button of the welder is pushed and takes over the control of the movable platen so that the contact surfaces of the workpieces are abutted quickly and held together as long as possible, just short of an actual freeze of such surfaces.

Duration of the preheating operation may be controlled as a function of time by a timer mechanism or as a function of relative movement of work holder platens in pressing the contact surfaces together, as by a limit switch.

Concurrently with the pushing of the start button of the welder, a relay is energized to automatically shift electrical contacts and cut into the arc-gap-dimension control apparatus the modifying preheat control apparatus, and after preheating the relay is automatically deenergized to automatically shift the electrical contacts and remove the modifying preheat control apparatus and thereby permit the arc-gap-dimension control apparatus to function in known manner.

DESCRIPTION OF THE DRAWINGS

In the drawings accompanying this description and forming a part of this specification there is shown, for purpose of illustration, an embodiment which my invention may assume, and in these drawings:

FIG. 2 is a graphic representation of the relative values of reference and arc-gap-signals during a welding operation, FIG. 3 is a graphic representation of platen motion with reference to the values shown in FIG. 2, FIG. 5 is a schematic representation of my improved preheat control, shown combined with a portion of the circuit shown in FIG. 4.

PRIOR ART

In order to fully understand the utility and novelty of my invention, a discussion of the background of control of the movable platen of a flashwelder is believed to be desirable.

Figure 1:
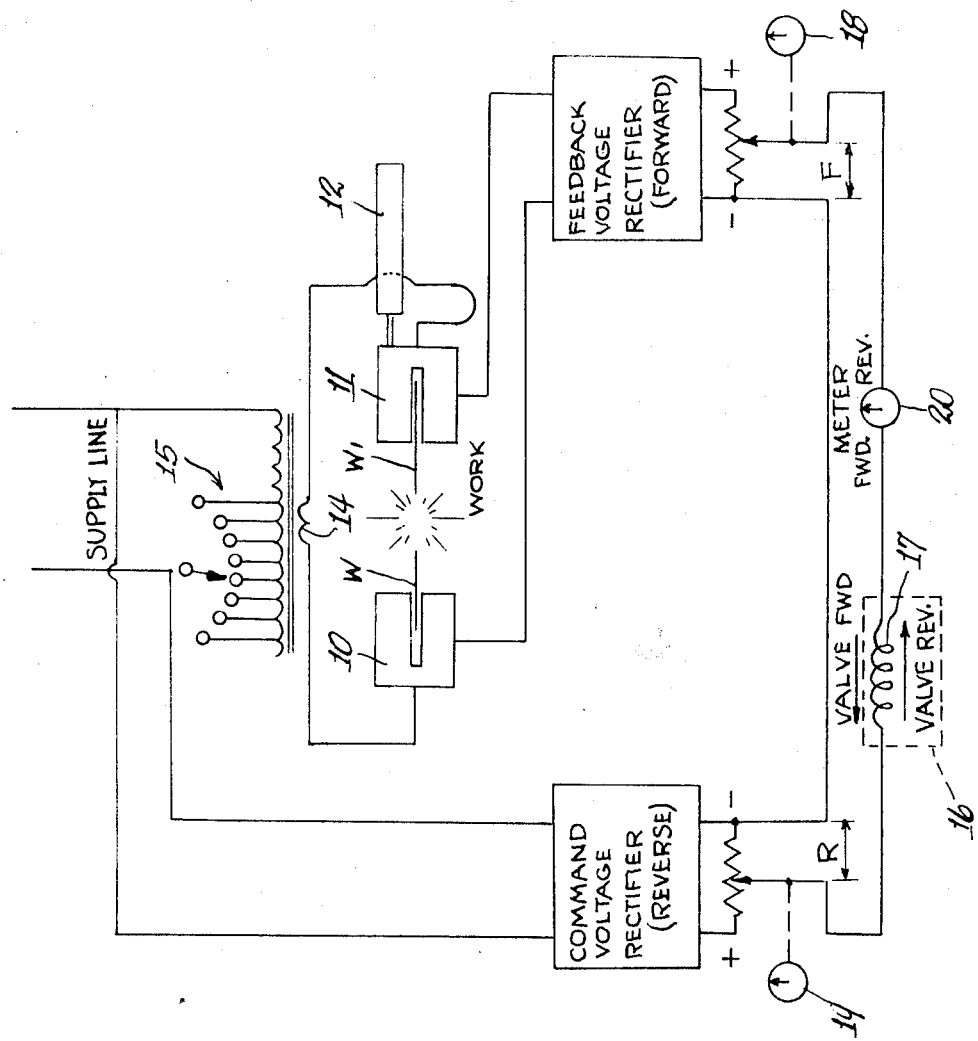
FIG. 1 is a schematic electrical circuit representation of an elementary and known arc-gap-dimension control apparatus.

As shown in FIG. 1, which discloses prior art, a flashwelder has a stationary platen 10 and a movable platen 11, the latter being guided for movement toward and away from the fixed platen, a hydraulic cylinder 12 providing the moving power. Each of the platens incorporates dies or clamps for respectively clamping the workpieces W and W1. The dies or clamps are electrically connected to opposite sides of the secondary 14 of a welding transformer 15, and a servo valve 16 controls flow of oil to opposite ends of the cylinder. The valve 16 includes a coil 17 for operating the valve spool in substantially the manner described in U.S. Pat. No. 3,542,994, issued to me and Richard L. Curtner on Nov. 24, 1970.

The velocity of the movable platen 11 is directly proportional to the rate at which oil is permitted to flow through the servo valve 16 and this rate in turn is proportional to the current in the valve coil. The direction of movement of the platen 11 is controlled by the direction of oil flow through the servo valve 16, and the direction may be reversed by reversing the direction of current in the valve coil. Thus, the velocity and direction of the platen 11 may be changed by varying the magnitude and direction of the valve coil current.

Referring to FIG. 1, the valve current is produced by a difference of two rectified (direct current) voltages. One of these voltages is taken from the machine transformer primary and is designated as the Command voltage, and the other is taken from the secondary of the machine transformer at the dies or clamps and is designated as the Feedback voltage. These voltages are rectified and the resulting DC voltage outputs are connected. If the outputs are equal in magnitude no net voltage is available to produce valve coil current.

If the Feedback voltage is greater than the Command voltage, the valve coil current will be in the direction that will cause the platen 11 to move forward or toward the platen 10 in normal flashing direction. If the Feedback voltage is less than the Command voltage, the platen will move in the reverse direction. The velocity of movement of platen 11 is directly proportional to the difference in the magnitudes of the two voltages.

Two potentiometers 18 and 19 are shown in FIG. 1 for the purpose of adjusting the magnitude of the two rectified voltages. If the welding machine is energized, and with no work in the dies or clamps, the potentiometers 18 and 19 may be adjusted so that no current is indicated on the meter 20 and therefore this indicates that there is no valve coil current, and the platen 11 will remain stationary.

If the potentiometer 18 is moved to the right (increasing positive voltage) current will appear in the coil and meter circuit in a right to left (forward) direction so that the servo valve spool will be shifted to cause flow of oil to the rear end of the cylinder 12 to move the platen 11 toward the platen 10 at a velocity determined by the current magnitude.

FIGS. 2 and 3 show the signals and platen movement as they exist during a normal weld sequence. In FIG. 2, it is assumed that the machine transformer has been energized, so that Command and Feedback signals appear in accordance with certain adjustments of the potentiometers 18 and 19. Assuming that the workpieces are not in contact, the set Feedback signal of ± 15 volts is proportional to the open circuit secondary voltage of the machine and is greater than the set −10 volts of the Command signal. Accordingly, the platen 11 is moved forwardly toward the platen 10 until the workpieces contact at B, shown in FIG. 3. The current passing between the contacting workpieces causes the Feedback signal to decrease to a value lower then the Command signal and therefore reverses the direction of movement of the platen 11, and this occurs from B to C seen in FIG. 3.

At C, the flashing action has started and this increases the Feedback signal to a level greater than the Command signal so that the platen 11 again moves forward toward the platen 10, but at a lesser velocity than that during the open circuit condition from A to B. Forward motion of the platen 11 continues until upset occurs at D.

Figure 4:
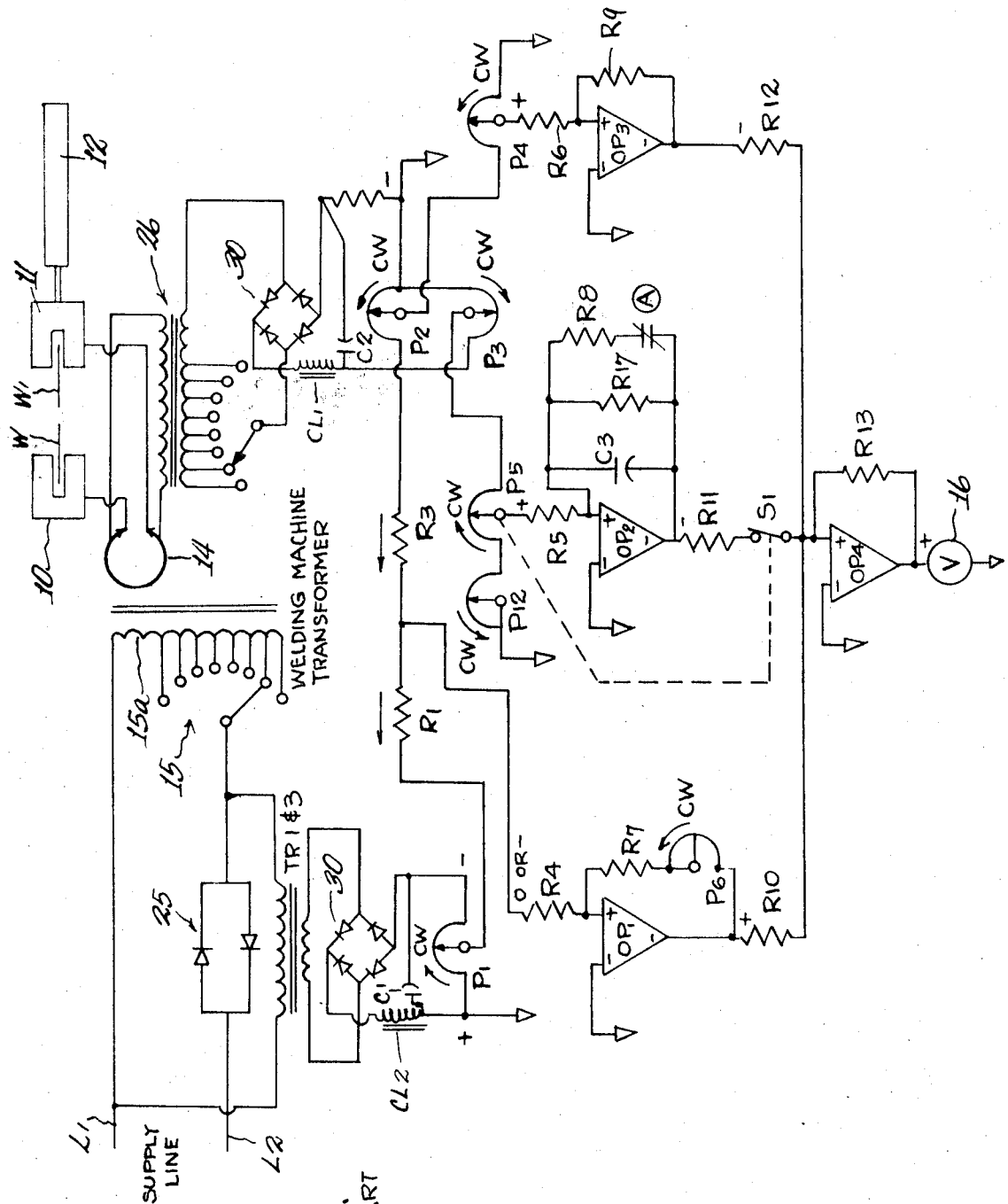
FIG. 4 is a schematic representation of a more sophisticated, but still known, arc-gap-dimension control apparatus.

FIG. 4 shows a more sophisticated circuit for controlling movement of the platen 11, and although this circuit is also within the prior art it is presented for a better understanding of my invention. The welding machine transformer 15 has its primary windings 15a connected to line wires L1, L2, from a 220 or 440 volt source, the usual ignitron tubes 25 being interposed in line L2 for controlling energization of the transformer 15. The secondary 14 of the welder transformer has its opposite ends connected to the welder dies or clamps 10, 11, as before. The secondary 14 is electrically connected to a step-up transformer 26. Both transformers have taps and the step-up transformer 26 has the same number of taps as the welding transformer but with exactly the inverse ratio of turns. Thus, if both transformers are always operated at the same tap number, the output of transformer 26 will not change, assuming there is constant primary voltage. This allows the machine secondary voltage to be changed by adjusting the machine transformer tap switch without affecting sensitivity or velocity signals, as will appear.

In FIG. 4, operational amplifiers and associated adjusters are used to replace the rectifiers and potentiometers of FIG. 1. Such operational amplifiers were originally used with computers to do mathematical operations, and in FIG. 4 are precision, high variable gain ac/dc amplifiers used in four modes in the illustrated circuit. These operational amplifiers are commercially available, and sources include Motorola, Inc., and Fairchild Semiconductor, Inc.

With reference to FIG. 4, operational amplify OP1 is used as a variable gain, linear, dc inverting amplifier. The voltage of chassis-ground appearing at the input of resistor R4 is increased by a factor equal to the quotient of the sum of resistor R7 plus potentiometer P6 divided by resistor R4. The increased output voltage appears across resistor R10. The output is always zero or positive, since the input is always zero or negative.

In order to provide a full understanding of the operation of the circuit shown in FIG. 4, values for the various parts will be given. However, it is to be understood that such values are illustrative only, and may be changed by varying circumstances. In view of the foregoing, R4 and R7 are 10K Ohmite 14 W, 10 percent, 1 turn and R10 is Ohmite 1M, one-fourth watt 10 percent; P6 is an Ohmite CS-1 potentiometer; 1 turn 500K.

Operational amplifier OP3 is used as a fixed gain dc inverting amplifier. The output which appears across resistor R12 is varied by changing the input voltage from potentiometer P4. The output polarity is always negative. R12 is Ohmite composition, 1M one-fourth watt 10 percent, and P4 is Ohmite GMV5031, 50K, 1 turn.

Operational amplifier OP2 is used as a dc integrating inverting amplifier. At the start of the welding machine sequence, normally closed contact A is opened, allowing capacitor C3 to charge when a voltage appears at resistors R4 and R5. At the instant the input voltage appears (machine welding power on) C3 acts as a low impedance shunt across resistor R17 and the gain of the amplifier is zero, thus giving zero output. As C3 charges with time, its impedance increases, thereby increasing the quotient of R17 divided by R5 and thus also the output voltage. The gain, or percent of final output voltage, will have reached a value of about 63 percent after a time interval (measured in seconds) equal to the product of the farad value of C3 and the Ohmic value of R5. The polarity of the output is always zero or negative. C3 in the present case is a Cornell Dubilier product, 0.1MFD. R5 is Ohmite composition, 470K, one-half watt 5 percent. R17 is a diode which may be purchased from Texas Instrument, In 2071, 600 VR.

Operational amplifier OP4 is used as a dc, unity gain inverting summing amplifier. Its input is the algebraic sum of the outputs of OP1, Op2 and OP3. The output of OP4 is equal in mangitude, but opposite in polarity to its input. The output of OP4 supplies the valve coil drive of the servo valve 16 which, in this instance, is a product of Moog, Inc., model No. 76–10x.

The control circuit shown in FIG. 4 requires two voltage sources for operation. One, the Command voltage, is fed from the primary of the welding transformer and is reduced through two transformers (designated TR1 and 3) in order to use readily available components. This Command voltage is then rectified at 30 and filtered through choke CL2 and capacitor C1. The positive side is connected to the control chassis ground.

The second voltage is the Feedback signal which is obtained from the dies or clamps 10,11, and fed through the tapped step-down transformer 26 that will maintain an output of approximately 6 volts if the tap switch is set at the same tap number as the welding machine transformer tap switch. This 6 volt source is rectified at 30, and filtered through choke CL1 and capacitor C2. The negative side is connected to the control chassis ground. Chokes CL1 and CL2 are 7 Hrys, 500 Ohm, and capacitors C1 and C2 are 1 MFD.

The positive side of the Feedback voltage is connected to the wiper of potentiometer P1 through two identical resistors R1 and R3. With the welding transformer 15 energized, and no work in the dies or clamps 10,11, P1 is adjusted so that the voltage from the midpoint of R1 and R3 to the chassis ground is zero. In the present case, R1 and R3 are Ohmite composition 1M, one-fourth watt 10 percent, and P1 is a Mallory potentiometer, 100K, 1 turn.

During the flashing period the Feedback dc voltage decreases and this changes the voltage at midpoint of resistors R1 and R3 to a negative value, giving a positive output for OP1. This positive output is fed to OP4 producing a negative output which acts to open the servo valve in a reverse sense, thereby causing retraction of the platen 11.

If the gain of OP1 is increased by rotating P6 clockwise, the platen 11 can be made to move with greater velocity for equal changes in the Feedback voltage. In other words, the platen motion becomes more sensitive to changes of the Feedback voltage signal. P6 is therefore called the "sensitivity" adjustment.

With the machine transformer 15 energized with no work in the dies, and with P1 adjusted to zero voltage, there is no output from OP1. If P5 and P4 are turned to full counter-clockwise positions, there is no input to OP4. At this time, it should be mentioned that the legend "CW" and the arrows adjacent the potentiometers indicate movement of the wipers when turned in clockwise relation. In the present disclosure, P1, P2, P3 and P12 are Mallory potentiometers, 100K, 1 turn.

If P4 is turned to a full clockwise position, OP3 will have an output determined by the setting of P2. P2 is adjusted so that the output of OP3 acting alone, is enough to produce a full load valve current of 0.0075 amperes. Thus, the valve coil current, and therefore the velocity of platen 11 may be controlled by adjusting the position of the wiper of P4, and the latter is termed the "velocity" control wherein clockwise rotation of the wiper increases the velocity.

With the machine welding transformer 15 energized, and P1 adjusted to zero and both P5 and P4 fully counter-clockwise, there will be no output from OP1, OP2 or OP3. Assuming that the machine transformer 15 is denergized and P5 advanced to full clockwise position and the machine transformer again energized, the gain, or output, of OP2 will increase as C3 is charged. If the correct values of R5 and C3 are used, P3 may be adjusted so that the output of OP2, acting alone, will produce a linear increase in value coil current up to the full load value of 0.0075 amperes during the minimum anticipated flashing interval. Likewise, with P5 fully counter-clockwise (but not in the extreme clocking position so as to open S1) P12 may be adjusted to linearly increase the valve current to 0.0075 amperes in a time interval equal to ten times the minimum time. A linear increase of valve coil current with respect to time results in constant acceleration of the platen 11 and a parobolic time-motion curve. P5 is therefore termed the "acceleration" control.

As before stated, the outputs of OP1, OP2 and OP3 are added algebraicly through resistors R10, R11 and R12 and become the input to OP4. The increasing output of OP2 can be added to the constant output of OP3 and this combined signal may be thought of as riding on a base which is the output of OP1.

A decrease in Feedback signal caused by a partial freeze of the work will decrease the sum of all inputs to OP4 and therefore the output of OP4 will either decrease, to decrease platen velocity, or change polarity and retract the platen. When the freeze is cleared, the combind signals will again produce forward platen motion. It is to be noted that the velocity and acceleration signals are derived from the Feedback voltage. This means that a decrease in the Feedback voltage will in turn modify the velocity and acceleration signals to OP4, thereby automatically decreasing the velocity and acceleration when required by lowered flashing voltage.

DESCRIPTION OF THE PREFERRED EMBODIMENT

My invention enables the user of a flash welder, having controls of either FIG. 1 or FIG. 4, to embody a pre-heat option.

During pre-heating, the desired effect is to modify the platen motion during the start of the flashing period by producing a rather slow oscillatory movement of platen 11 so as to elevate the temperature of the work by heat energy developed by passage of current through the resistance offered by the workpieces themselves and by their abutting surface. This requires that the response of the platen motion to variations in the feedback signal be increased, and that the start of the return motion of the platen be delayed more than the start of the forward motion. It is also desirable to adjust these three variables, and to terminate the pre-heat period after an adjustable timed interval, or after an adjustable forward movement of the platen.

FIG. 5 discloses parts of the control circuit shown in FIG. 4 as combined with the pre-heat components included in my invention, the former being shown in Zones 1 and 3, and the latter being shown in Zones 2 and 4.

The additional components required for the pre-heat circuit include the following: a pre-heat timer to switch 35 and/or a pre-heat limit switch 36; an On-Off switch 37; a relay ARCR controlling contacts ARCR2 shown in Zone 2 as affecting electrical connections between the flashing control circuit and the pre-heat addition; and four adjustment potentiometers, including a pre-heat time adjustment potentiometer 37 which is usually built into the pre-heat timer 39a, a pre-heat sensitivity potentiometer P13, a pre-heat velocity potentiometer P15, a pre-heat cool potentiometer P14, a capacitor C6, a transistor Q1 and a resistor R18.

The pre-heat velocity P15 potentiometer is provided to increase the forward motion signal during the pre-heat interval. The pre-heat sensitivity potentiometer P13 is required to decrease the circuit sensitivity so as to prevent platen retraction during what would normally be a freeze condition. The capacitor C6, resistor R18, potentiometer P14 and transistor Q1 change the operation of OP1 to that of an integrating amplifier. The combination of transistor Q1, resistor R18 and potentiometer P14 enable the charging and discharging time constants to be varied independently. The setting of the preheat time potentiometer 39 determines the time interval during which the pre-heat circuit is effective. If the limit switch 36 is used, actuation of the switch by a predetermined amount of movement of the platen 11 terminates the pre-heat time. At the end of the pre-heat time, relay ARCR is changed in state and the contacts ARCR2 revert to the positions shown in Zone 2 of FIG. 5.

When the pre-heat feature is desired, the On-Off switch is plated on On position, which is indicated by T.D.* or L.S.*. This places the relay ARCR across lines L3 and L4 to energize the relay so that all the contacts marked ARCR2 change from their positions shown in FIG. 5. Energization of the relay ARCR thereby substitutes the pre-heat circuit sensitivity and velocity components P13 and P15 and prevents the acceleration circuit heretofore described from working.

The initiation contacts 45 are closed when the welding contactor is energized, and this places the pre-heat timer 39a across lines L3 and L4, and the pre-heat timer begins to time the pre-heat interval, and the preheat circuit is activated.

Despite the change in the contacts ARCR2 in electrical connection with operational amplifier OP3, the velocity circuit will operate in normal manner since potentiometer P15 is substituted for potentiometer P4 and provides a net forward motion signal to the valve coil as long as the Feedback signal plus the velocity signal is greater than the Comman signal. This will be true, if the settings are correct, whenever the work ends are separated.

If the sensitivity circuit in Zone 4 has been adjusted during the set-up procedure for zero output at open circuit (no work bridging the dies or clamps) any current path between the dies, such as formed when the ends of a metal ring are to be welded, will cause the sensitivity amplifier to produce a signal which will, in the absence of any other valve coil signal, act to retract the platen. However, if the velocity signal is high enough, the net valve coil signal will be positive, giving forward platen motion. As the work temperature increases during the pre-heat period, the Feedback voltage will gradually increase and the platen forward velocity may become greater than required for regular flashing. For this reason, the second velocity potentiometer P15 is provided for the pre-heat portion of the cycle.

The pre-heat sensitivity potentiometer P13 is provided to reduce the sensitivity during the pre-heat period since it is not desirable to retract the platen at too great velocity after work contact. Capacitor C6 in combination with potentiometer P13 acts as an integrator and delays the generation of the retraction signal so as to keep the workpieces in contact for a longer interval. Low settings of potentiometer P13 will increase this time.

When the workpieces separate, the voltage across capacitor C6 decreases and this capacitor discharges through transistor Q1 and the cool time potentiometer P14. Whenever the output voltage of OP1 (which appears across the Feedback circuit of R7 and R13) is positive and greater than the charge on capacitor C6, transistor Q1 is reversed biased and acts as a high resistance. When the reverse is true, transistor Q1 is forward biased and discharges through capacitor C6 and potentiometer P14. If the resistance of potentiometer P14 is increased by clockwise rotation, the retraction motion output signal of operational amplifier OP1 is retained for a longer time and the cool time, or the time that the work ends are separated, is increased. At the end of the pre-heat time, that is when the timer 39a has timed out (or when the limit switch 36 actuated) relay ARCR is de-energized by an opening of pre-heat timer switch 35 (or pre-heat limit switch 36) and the normal adjustment potentiometers are switched back into the circuit.

I claim:

1. In a flash welder having an arc-gap-dimension control apparatus employing a servomechanism controlled by a reference-voltage signal derived from the input line voltage and an opposing voltage-signal derived from the arc gap, said servomechanism in turn controlling movement of the movable platen of said flash welder, said control apparatus including three operational amplifiers in an electrical circuit with the primary and secondary windings of the welding machine transformer and influenced by said opposing voltage-signal derived from said arc gap, one of said operational amplifiers being in electric circuit with a potentiometer which is adjustable to vary sensitivity of platen movement, another of said operational amplifiers being in electric circuit with a potentiometer which is adjustable to vary velocity of platen movement, and a third operational amplifier being in electric circuit with a potentiometer which is adjustable to vary acceleration of platen movement, the outputs of said three operational amplifiers being added algebraically and delivered as input to a fourth operational amplifier, the output of the latter controlling operation of said servomechanism, the improvement comprising:
   a preheat control apparatus including further potentiometers in an electrical circuit and
   switch means adapted to selectively place said further adjustable potentiometers in electrical circuit with said three operational amplifiers to modify the operation of the same.

2. The improvement defined in claim 1 wherein said switch means is operated by a relay coil which is energized simultaneously with energization of the welding contactor of the flash welder, energization of said relay coil being operable to place said further potentiometers in electrical circuit with said three operational amplifiers.

3. The improvement defined in claim 2 and further including timer means for causing de-energization of said relay coil following a pre-determined time period, de-energization of said relay coil being operable to remove said further potentiometers from electrical circuit with said three operational amplifiers.

4. The improvement defined in claim 3 wherein said timer means is actuated to start its timing function simultaneously with the energization of said relay coil.

5. In a flash welder having an arc-gap-dimension control apparatus employing a servomechanism controlled by a reference voltage signal derived from the input line voltage and an opposing voltage signal derived from the arc gap, said servomechanism in turn controlling movement of the movable platen of said welder, an operational amplifier (OP1) influenced by said opposing voltage signal derived from said arc gap, a capacitor (C6), transistor (Q1), resistor (R-18) and potentiometer (P-14) in circuit with said operational amplifier (OP1) as shown and described, to provide an integrating function in which the charging and discharging time constants of said capacitor may be selectively modified.

* * * * *